(12) United States Patent
Plestid (10) Patent No.: US 8,452,854 B2
(45) Date of Patent: May 28, 2013

(54) METHOD AND APPARATUS FOR REMOTE MANIPULATION OF ATTACHMENTS

(75) Inventor: Trevor Plestid, Ottawa (CA)

(73) Assignee: Research In Motion Limited, Waterloo, ON (CA)

( * ) Notice: Subject to any disclaimer, the term of this patent is extended or adjusted under 35 U.S.C. 154(b) by 877 days.

(21) Appl. No.: 12/140,331

(22) Filed: Jun. 17, 2008

(65) Prior Publication Data

US 2009/0313348 A1 Dec. 17, 2009

(51) Int. Cl.
*G06F 15/16* (2006.01)
(52) U.S. Cl.
USPC .......................................................... 709/219
(58) Field of Classification Search
USPC .......................................................... 709/219
See application file for complete search history.

(56) References Cited

U.S. PATENT DOCUMENTS

| | | | | |
|---|---|---|---|---|
| 6,073,142 A * | 6/2000 | Geiger et al. | .................. | 715/205 |
| 6,101,320 A * | 8/2000 | Schuetze et al. | .............. | 709/206 |
| 6,101,526 A * | 8/2000 | Mochizuki | .................... | 709/200 |
| 6,256,666 B1 | 7/2001 | Singhal | | |
| 6,654,891 B1 * | 11/2003 | Borsato et al. | .................... | 726/6 |
| 6,868,444 B1 * | 3/2005 | Kim et al. | ..................... | 709/223 |
| 2001/0051991 A1 * | 12/2001 | Beyda et al. | .................. | 709/206 |
| 2002/0010748 A1 | 1/2002 | Kobayashi et al. | | |
| 2003/0028647 A1 * | 2/2003 | Grosu | ........................... | 709/227 |
| 2003/0095550 A1 | 5/2003 | Lewis et al. | | |
| 2004/0024826 A1 * | 2/2004 | Halahmi et al. | .............. | 709/206 |
| 2006/0133340 A1 * | 6/2006 | Rybak et al. | .................. | 370/338 |

FOREIGN PATENT DOCUMENTS

WO 2008101074 A 8/2008

OTHER PUBLICATIONS

S. Maes et al., "Internet Email to Support Diverse Service Environments (Lemonade) Profile", Internet Engineering Task Force (IETF) Open Standard (RFC 4550, dated Jun. 2006).
"OMA-AD-Mobile_Email-V1_0-20050929-D" (Mobile Email Architecture, Draft Version 1.0—Sep. 29, 2005), Open Mobile Alliance Ltd, 2005.
G. Klyne et al. Registration of Mail and MIME Header Fields; rfc4021.txt,Mar. 1, 2005, XP015041978.
European Examination Report dated Mar. 19, 2010.

* cited by examiner

*Primary Examiner* — Peling Shaw
(74) *Attorney, Agent, or Firm* — Perry + Currier (57) ABSTRACT

A method and apparatus for manipulating email attachments within a server remotely from a mobile communication device, comprising, receiving a first message within the server, wherein the message has at least one attachment; displaying at least one menu option within the mobile communication device for manipulating the attachment; sending a further message to the server from the mobile communication device responsive to selection of the at least one menu option for manipulating the attachment; and temporarily copying the attachment into a buffer within the server for subsequent re-use.

20 Claims, 13 Drawing Sheets

METHOD AND APPARATUS FOR REMOTE MANIPULATION OF ATTACHMENTS

FIELD

The present specification relates to displaying content on mobile communication devices, and in particular to remote manipulation of email attachments from mobile communication devices.

BACKGROUND

Mobile communication devices are ubiquitous for business and personal use. Handheld mobile communication devices, sometimes referred to as mobile stations, are essentially portable computers having wireless capability, and come in various forms. These include Personal Digital Assistants (PDAs), cellular phones and smart phones. While their reduced size is an advantage to portability, bandwidth and processing constraints of such devices present challenges to the downloading and viewing of email attachments, such as word processing documents, audio files, tables and images. In particular, downloading large attachments consumes significant over-the-air (OTA) bandwidth and battery power on the mobile device. Further, downloading large attachment may also lead to increased bandwidth consumption which inherently increase usage costs.

These challenges extend to the manipulation of email attachments from mobile communication devices. For example, there is no simple mechanism, using prior art attachment service technology, for a user who is one of several recipients in a distribution list of an email that includes an attachment, to do such things as (i) reply to the sender and all recipients while adding a further recipient who is not part of the distribution list and including the attachment in the reply to the further recipient without natively downloading the attachment, (ii) privately forward the attachment to the further recipient, or (iii) send a new email to the further recipient that includes the attachment but not the original email thread from the original sender to the distribution list.

Windows Mobile® software is capable of natively storing attachments on a mobile communication device, wherefrom email messages may be composed including the saved attachment. However, as discussed above, downloading of attachments to the mobile device consumes significant OTA bandwidth and battery power on the mobile device.

Also known in the art are the LEMONADE extensions to the existing IMAP and SMTP protocols, established as an Internet Engineering Task Force (IETF) Open Standard (RFC 4550, dated June 2006), which enable a mobile device email client to forward a message having an attachment to a third party without first downloading the attachment to the mobile device. This is accomplished using a one-time access cookie (URL) provided to the email client by the IMAP server and then forwarded by the email client to the SMTP server which then fetches the message using the cookie directly from the IMAP server and forwards the message to the new recipient.

U.S. Pat. No. 6,256,666 (IBM) discloses a mobile communication device that includes remote software agent to detach an email attachment to a particular path on a file system on behalf of a mobile user. However, the mobile communication device of U.S. Pat. No. 6,256,666 must create a special email message, referred to as Attachment Control Messages (ACM) that incorporates a unique subject line (i.e. "ACM header"), for encapsulating instructions from the device to a server. Further, the device of U.S. Pat. No. 6,256,666 is capable only of facilitating delete/detach/launch functions, but does not copy, paste or buffer the attachment within the server for subsequent manipulations within the email system The Open Mobile Alliance has defined a further functionality (see OMA-RD-MobileEmail-V1_0-20050929-D) that is similar to the LEMONADE extensions discussed above, that permits forwarding of email without downloading of attachments to the mobile communication device.

It is not known from the foregoing prior art how to manipulate files in a file server system within an enterprise from a remote mobile communication device such that the files may be buffered within the file server system, without resorting to generation of encapsulated control messages and the use of ad hoc message generation protocols as in U.S. Pat. No. 6,256,666. More particularly, it is not known how to reply from a mobile communication device to a sender and all recipients in a distribution list while adding a further recipient who is not part of the distribution list and including the attachment in the reply to the further recipient, or privately forward the attachment to the further recipient, or send a new email to the further recipient that includes the attachment but not the original email thread from the original sender to the distribution list.

BRIEF DESCRIPTION OF THE DRAWINGS

Exemplary embodiments will be better understood with reference to the following Figures in which like numerals denote like parts and in which.

DETAILED DESCRIPTION

Several aspects of this specification are set forth, as follows:

A method of manipulating email attachments within a server remotely from a mobile communication device, comprising receiving a first message within said server, said message having at least one attachment; displaying at least one menu option within said mobile communication device for manipulating said attachment; sending a further message to said server from said mobile communication device responsive to selection of said at least one menu option for manipulating said attachment; and temporarily copying said attachment into a buffer within said server for subsequent re-use.

A server, comprising: a messaging agent for receiving a first message having at least one attachment; a dispatcher for receiving a second message remote from said server to manipulate said attachment; a buffer; and an attachment server process for temporarily copying said attachment into said buffer responsive to said dispatcher receiving said second message and pasting said attachment from said buffer into a further message.

A method of operating a server, comprising: receiving a first message having at least one attachment; receiving a second message remote from said server to manipulate said attachment; and temporarily copying said attachment into a buffer responsive to receiving said second message, and pasting said attachment from said buffer into a further message.

A mobile communication device, comprising: a communications subsystem for receiving a first message having at least one attachment; a display; and a content handling application for displaying at least one menu option on said display for manipulating said attachment without downloading said attachment to said device, and sending a second message via said communications subsystem responsive to selection of said at least one menu option, for remotely manipulating said attachment.

A method of operating a mobile communication device, comprising: receiving a first message identified by a message ID and having at least one attachment identified by a file name and a time value; displaying at least one menu option for manipulating said attachment without downloading said attachment to said device; and sending a second message responsive to selection of said at least one menu option, for remotely manipulating said attachment.

A method of operating a mobile communication device, comprising: receiving a plurality of messages in a mailbox, each said message being identified by a message ID, and at least one of said messages having an attachment; generating a warning message that said plurality of messages exceeds a predefined storage limit for said mailbox and displaying at least one menu option; and sending a further message responsive to selection of said at least one menu option, for remotely buffering said at least one attachment, thereby freeing up space in said mailbox.

Figure 1:
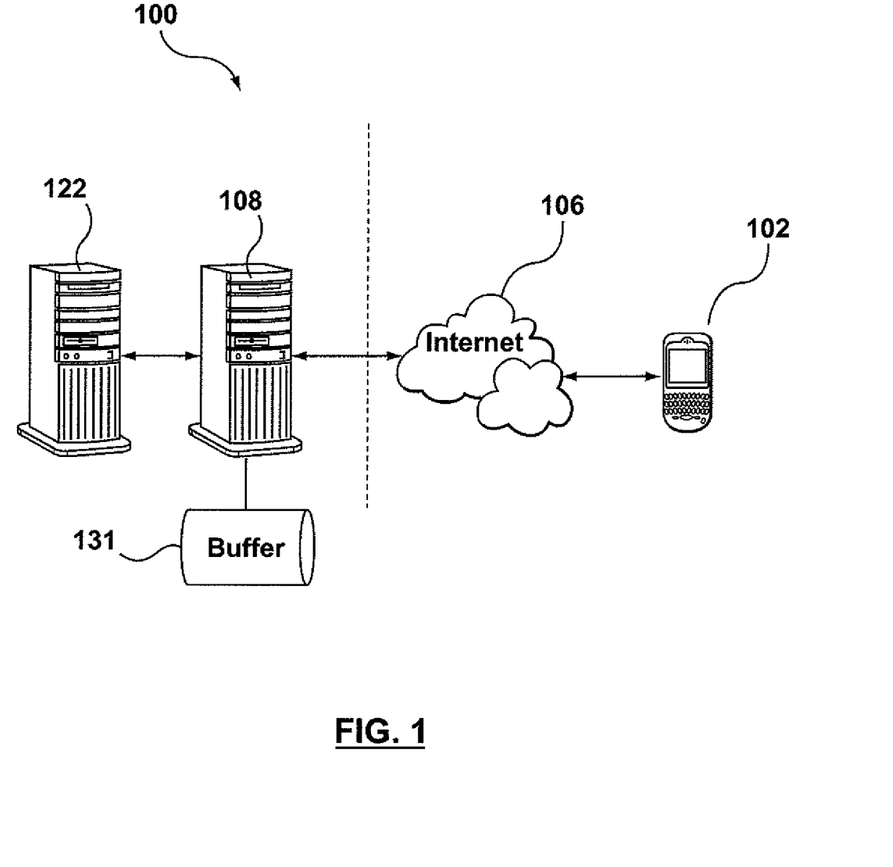
FIG. 1 is a schematic diagram of a wireless communication system.

Referring now to FIG. 1, a communication system 100 is shown for facilitating communication with and between mobile communication devices 102 (also referred to herein as mobile device 102). Each mobile communication device 102 is operable to effect communications over a radio communications channel with a base station (not shown) while located within a coverage area that is defined by the base station. The base station is part of a wireless network that is in communication with the Internet 106. Data is delivered to the mobile communication device 102 via wireless transmission from the base station. Similarly, data is sent from the mobile communication device 102 via wireless transmission to the base station.

It will be appreciated that the mobile communication device 102 is movable within the coverage area and can be moved to coverage areas defined by other base stations. A relay (not shown) is provided to route data, such as email messages, for example, between the Internet 106 and the base station of the mobile communication device 102. Further, as will be understood by one of ordinary skill in the art, wireless networks include GSM/GPRS, CDPD, TDMA, iDEN, Mobitex, DataTAC networks, EDGE, 1xRTT/EVDO or UMTS/HsxPA and broadband networks such as Bluetooth and variants of 802.11.

A server 108 handles wireless client requests received from the mobile communication device 102 via the Internet 106. A firewall or a proxy server (not shown) may also be provided between the server 108 and the Internet 106. The server 108 includes an attachment server process (not shown) and a buffer 131, as discussed in greater detail below. The attachment server process incorporates file-parsing distillers for specific document types, to build in-memory Document Object Model (DOM) structures representing attachments of the specific document types. The document DOM structure is stored in a memory cache of server 108, apart from the buffer 131, and can be iterated bi-directionally.

A mail server 122 communicates with the server 108 to exchange emails with an email client (not shown) such as Microsoft Outlook™. The server 108 sends compressed copies of emails received at the mail server 122 to the mobile communication device 102 via the Internet 106 and wireless network (including any relays, routers, dispatchers, etc). Buffer 131 is used to temporarily store one or more email attachments for manipulation by the mobile communication device 102, as discussed in greater detail below. Typically, multiple email clients communicate with the mail server 122. Emails originating from the email clients are stored at the mail server 122 before being compressed at server 108 and sent out over the Internet 106. Similarly, emails received from the Internet 106 are decompressed and transmitted to the email clients via the server 108 and the mail server 122

The server 108 uses the attachment server process indicated above to process attachment data from the mail server 122 (e.g. documents, spreadsheets, presentations, etc.). Additional attachment servers may be provided for communication with the server 108 and with one another to create an attachment server network. It will be appreciated that any number of attachment servers may be provided. The number of attachment servers may be selected based on the number of mobile communication devices 102 communicating with the server 108.

Although server 108 is described as including an attachment server process, it may alternatively be limited to non-attachment server functions but in communication with one or more attachment servers for processing attachment data.

Figure 2:
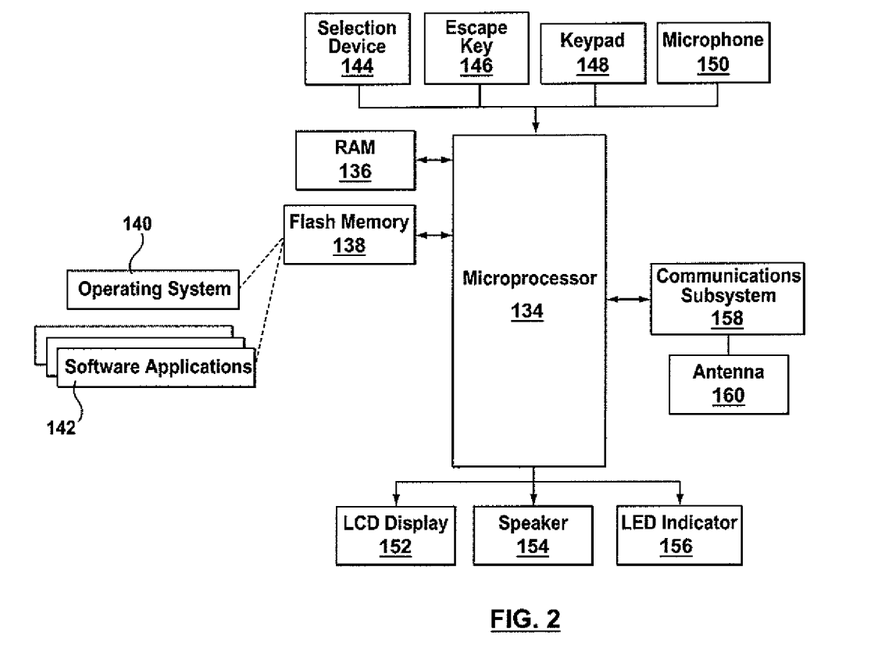
FIG. 2 is a block diagram of components of a mobile communication device according to an embodiment.

FIG. 2 is a block diagram of certain components, including internal components, within the mobile communication device 102. The mobile communication device 102 includes a microprocessor 134 connected to a random access memory (RAM) 136 and a persistent storage device, which in the illustrated embodiment is a flash memory 138. Flash memory 138 is responsible for various non-volatile storage functions of the mobile communication device 102, such as operating system software 140, executable by the microprocessor 134. It will be appreciated, however, that the operating system software 140 can be stored in other types of memory such as read-only memory (ROM). In the illustrated embodiment, software applications 142 are stored in the persistent storage device 138 for execution by the microprocessor 134 for carrying out various functions, as is known in the art. The microprocessor 134 receives input from various input devices including a selection device 144 such as a thumbwheel or trackball, for example, an escape key 146, a keypad 148 and a microphone 150 and outputs to various output devices including an LCD display 152, a speaker 154 and an LED indicator 156.

The mobile device 102 may send and receive communication signals over the wireless network after required network registration or activation procedures have been completed. Network access is associated with a subscriber or user of the mobile device 102 via a SIM/RUIM card (i.e. Subscriber Identity Module or a Removable User Identity Module) within the communication subsystem 158. The SIM card (not shown) or RUIM is one type of a conventional "smart card" that can be used to identify a subscriber of the mobile device 102 and to personalize the mobile device, among other things.

In a data communication mode, a received signal such as an email message or Web page is processed by the communications subsystem 158 and input to the microprocessor 134 for further processing and output to the LCD display 152. A user of the mobile communication device 102 can also compose data items within a software application such as messaging application, using the keypad 148, for example, in conjunction with the selection device 144 and the LCD display 152. Such composed items can then be transmitted over the communications network through the communications subsystem 158 and antenna 160.

For voice communications, the overall operation of the mobile device 102 is substantially similar, except that the received signals are output to the speaker 154, and signals for transmission are generated by the microphone 150. Alternative voice or audio I/O subsystems, such as a voice message recording subsystem, can also be implemented on the mobile device 102. Although voice or audio signal output is accomplished primarily through the speaker 154, the display 152 can also be used to provide additional information such as the identity of a calling party, duration of a voice call, or other voice call related information.

As indicated above, the flash memory 138 stores a plurality of applications 142 executable by the microprocessor 134, such as a message application for allowing a user to send and receive electronic messages (email), an attachment content handling application, which operates in conjunction with the message application to provide the user with attachment content handling options for messages that have an associated attachment. The attachment may be a document converted to plain text, an audio file compressed to WAV or an image file, for example. Once the user selects an attachment document for viewing according to a preferred attachment content handling option, the attachment content handling application generates a request for server 108 to download the transcoded/compressed attachment, which can thereafter be viewed/played using an attachment viewer application.

However, as discussed in greater detail below with reference to FIG. 4, according to an exemplary embodiment, the content handling application also permits the user to manipulate the attachment (e.g. copy, paste, save) to buffer 131 within the server 108, without downloading the attachment to the device 102, thereby providing enhanced functionality without consuming OTA bandwidth and device battery power.

In the embodiment of FIG. 2, the mobile communication device 102 is based on the computing environment and functionality of a wireless personal digital assistant (PDA). It will be understood, however, that the mobile communication device 102 is not limited to wireless personal digital assistants. Other mobile communication devices are possible, such as smart telephones, portable entertainment devices, etc.

Figure 3:
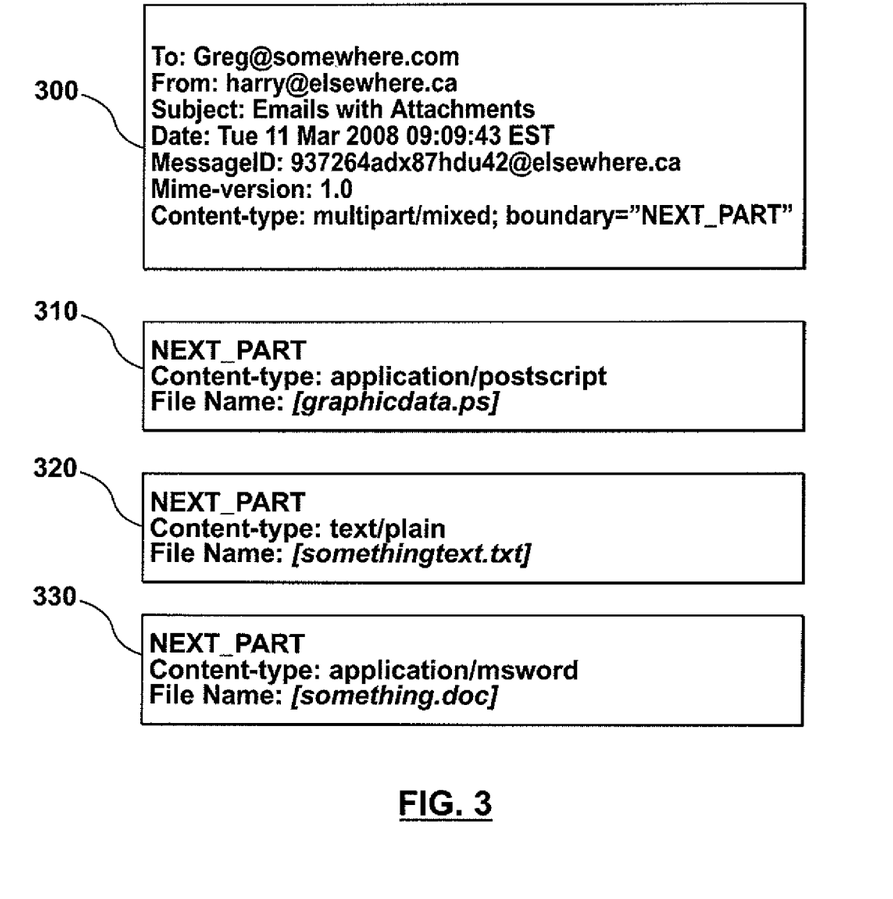
FIG. 3 is a schematic illustration of an email message containing multiple document attachments.

Referring now to FIG. 3, an example is shown of an email message containing multiple document attachments that have been encoded using the well known MIME format, as specified in IETF RFC 1521 and RFC 1522. The email message contains several header fields 300, including 'To: ', 'From: ', 'Subject: ', and 'Date: '. Each message is also assigned a unique message ID (MessageID), by the mail server 122. MIME encoding is indicated by the presence of a Content-Type: header field. The value of this field indicates what type of information is contained in the email message (e.g. "text/plain" to indicate plain text, "application/postscript" to indicate a PostScript file, "application/msword" to indicate a Microsoft WORD® document, etc.). The Content-Type field may have optional sub-fields for encoding, character set, etc.

As shown in FIG. 3, one value for the Content-Type: header is "multipart/mixed" which indicates that the message consists of multiple parts, each having a different type; this header is typically also accompanied by a "boundary" attribute. The document is divided into parts, for example, parts 310, 320, and 330, each distinguished by a 'Content-Type:' field that describes the content type for the associated part, and a file name for the attachment (e.g. graphicdata.ps, somethingtext.txt, something.doc, etc).

Figure 4A:
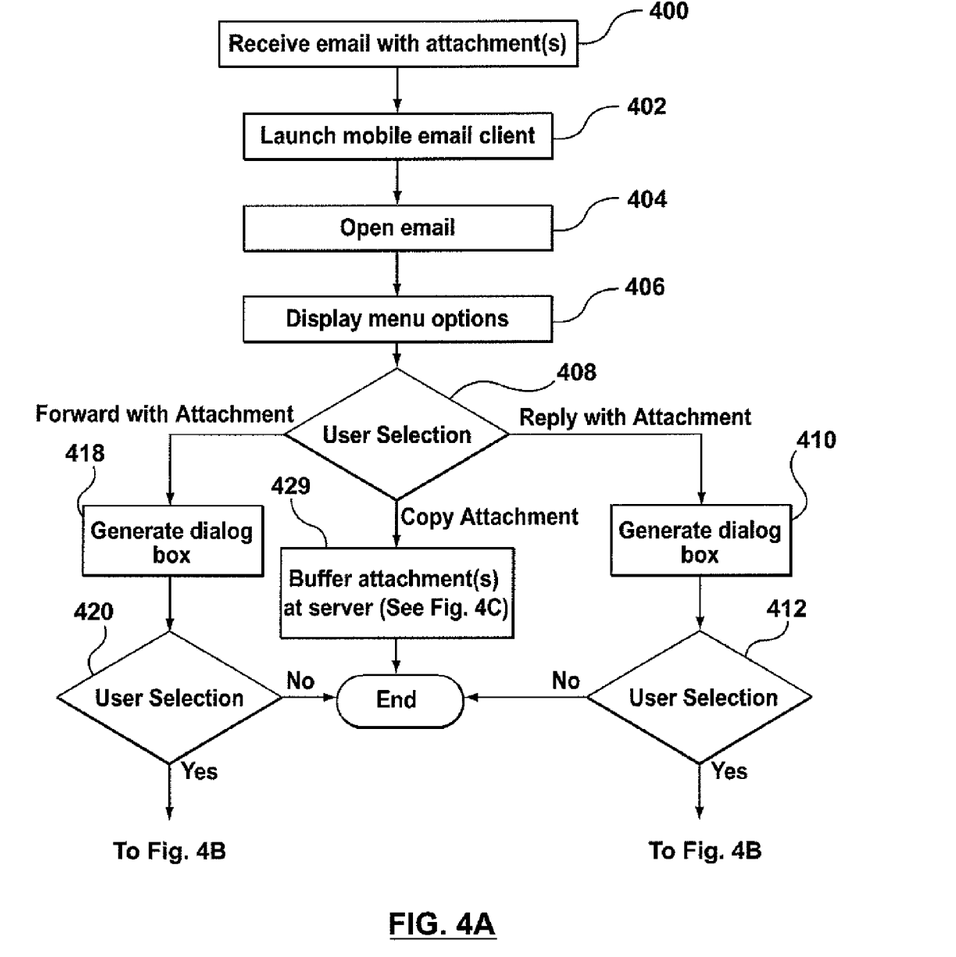
FIGS. 4A and 4B, in combination, comprise a flowchart showing steps of an exemplary method for remotely manipulating attachments from the mobile communication device of FIG. 2.
Figure 4B:
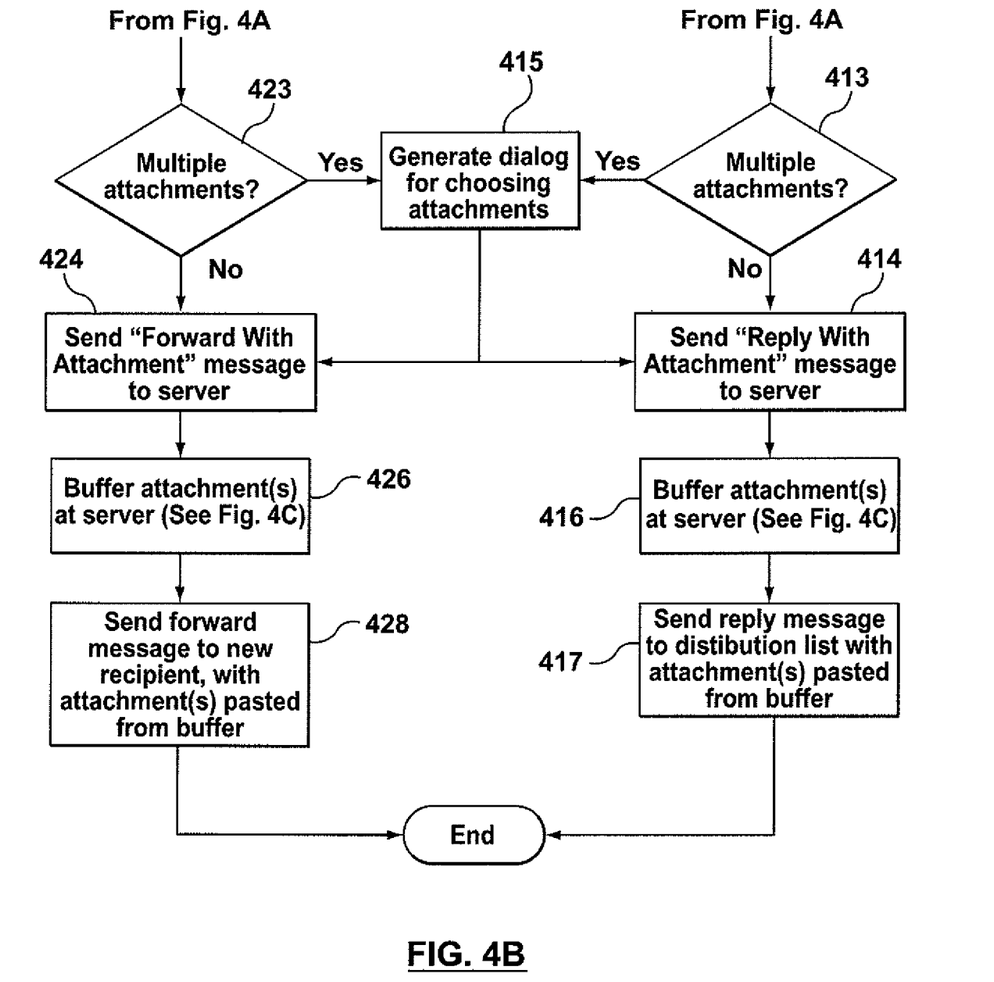
Figure 5:
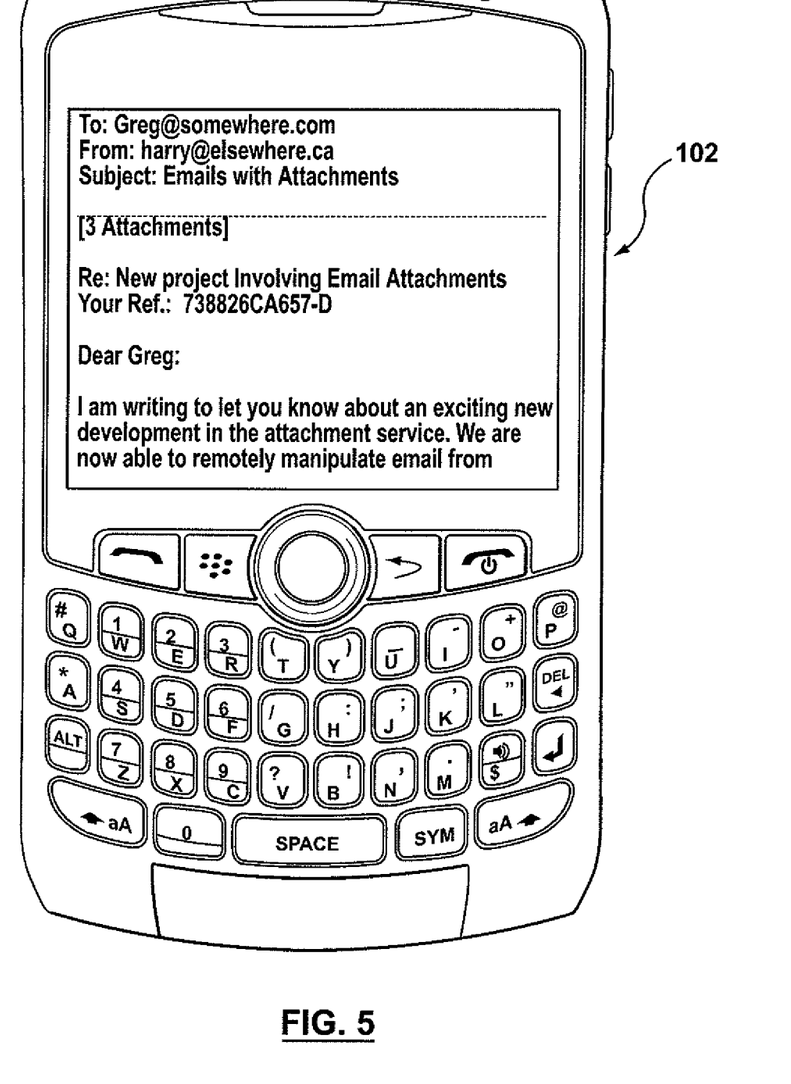
FIG. 5 shows an email with attachments as displayed on a mobile communication device such as shown in FIG. 2.
Figure 6A:
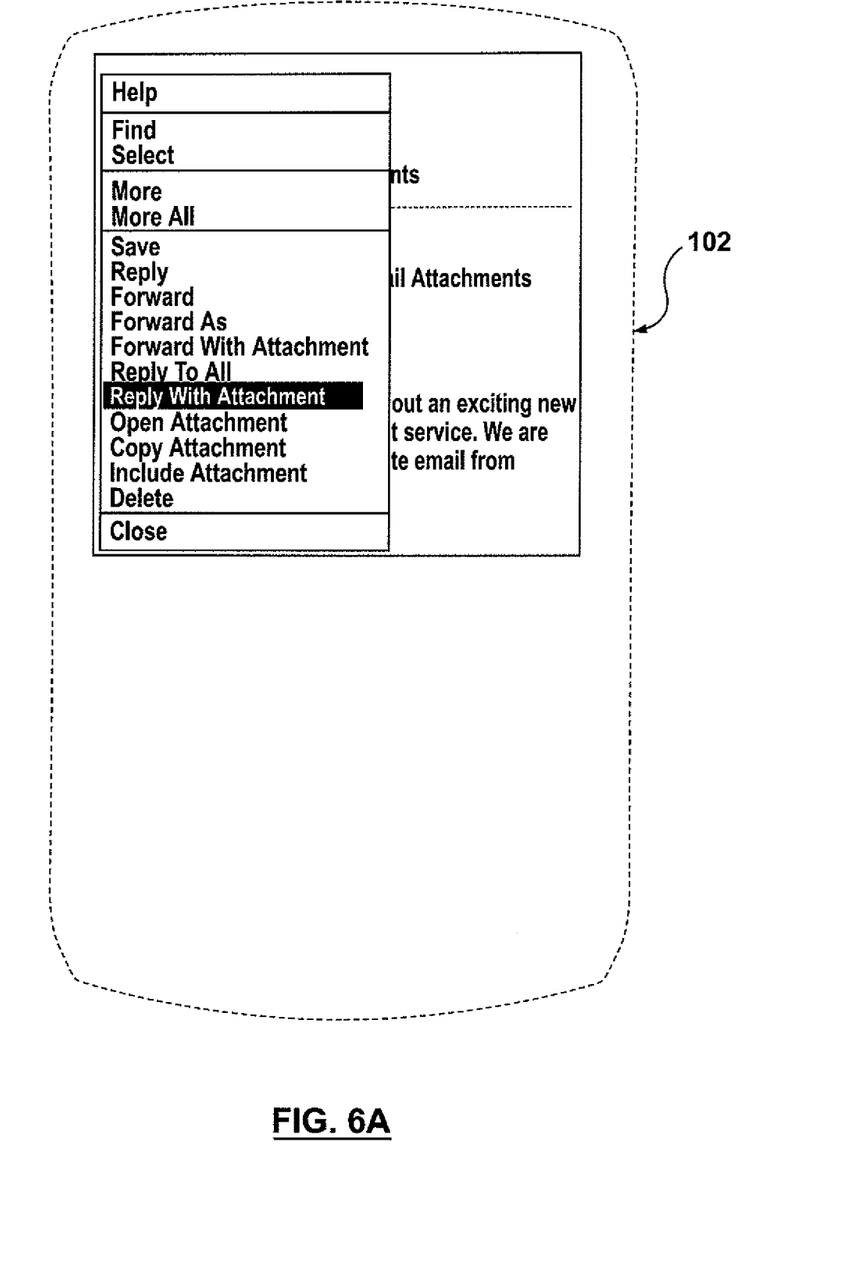
FIG. 6A shows a graphical user interface of menu options for handling the email depicted in FIG. 5.

FIGS. 4A and 4B set forth steps of an exemplary method for remotely manipulating attachments from the mobile communication device 102, without downloading the attachments to the mobile device. Following receipt within the server 108 of a message, such as an email, text message, etc., with an attachment (step 400), and upon launching a mobile application on device 102 (step 402), a user may open the message (e.g. email) by actuating selection device 144 (step 404), such as a trackball or trackwheel, etc, causing the message to be displayed, as shown in FIG. 5. Upon further actuation of the selection device 144 (or another input device such as a menu key, etc.), a menu of options is presented (step 406) for handling the message, as shown in FIG. 6A. A person of skill in the art will appreciate that the menu options depicted in FIG. 6A are exemplary only, and that additional or alternative menu items may be presented including, but not limited to "Mark Unopened", "Email Docketing", "MMS Docketing", Show Address", Previous Item", "Next Item", Next Unopened Item", Add to Address Book", "Switch Application", etc.

Figure 6B:
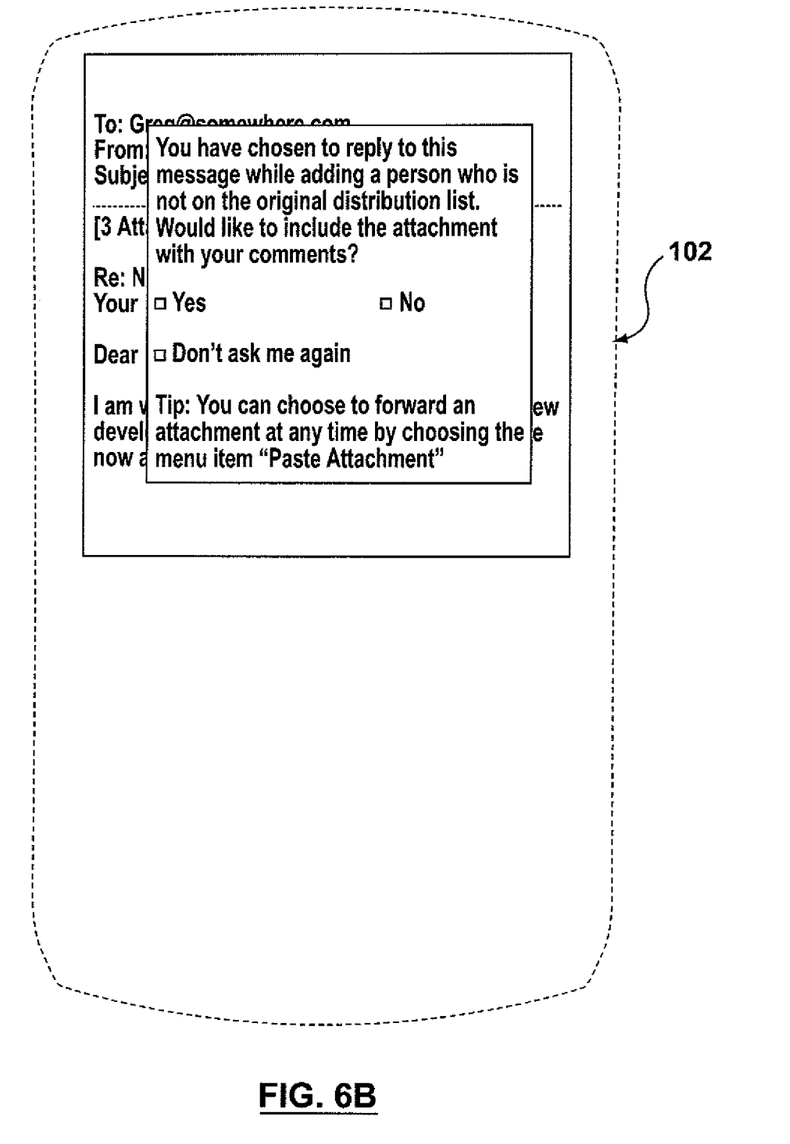
FIG. 6B shows a first user interface generated responsive to user selection of a Reply With Attachment option of the menu options shown in FIG. 6A.

Upon user selection (step 408) of the "Reply With Attachment" menu option, the mobile communication device 102 generates a dialog screen (step 410), as shown in FIG. 6B, requesting confirmation that the user intends to reply to all, while adding a person who is not in the original distribution list for the message and to forward the attachment to the new recipient. It will be noted that the dialog screen of FIG. 6B also includes a user tip or advisory for encouraging the user not to download the attachment to the mobile communication device 102, but rather remotely copy to and paste the attachment from the buffer 131, thereby preserving over-the-air (OTA) bandwidth and battery power on the mobile device.

If the user responds affirmatively ("Yes" at menu option step 412), and if there is only one attachment (a "No" at step 413 of FIG. 4B) the mobile communication device 102 compresses and encrypts a message containing the "Reply With Attachment" command over the wireless network, which in response sends the message to the server 108 (step 414). The server 108 decrypts and decompresses the message, and invokes the attachment server process over an associated port to retrieve the attachment from the user's inbox (message store) at mail server 122, and then temporarily stores the attachment in buffer 131 (step 416).

Figure 4C:
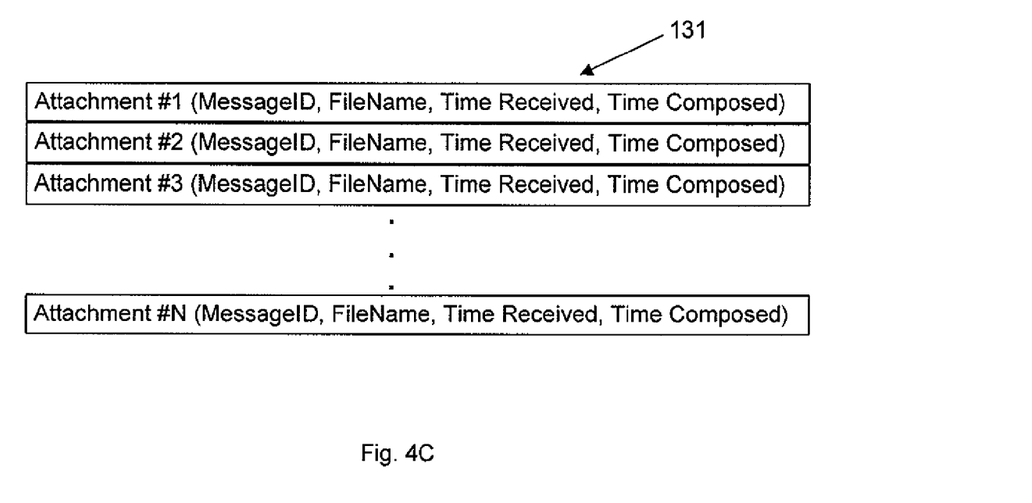
FIG. 4C is a schematic representation of multiple attachments copied into an attachment buffer within a server of the wireless communication system of FIG. 1 using the method of FIGS. 4A and 4B.
Figure 6C:
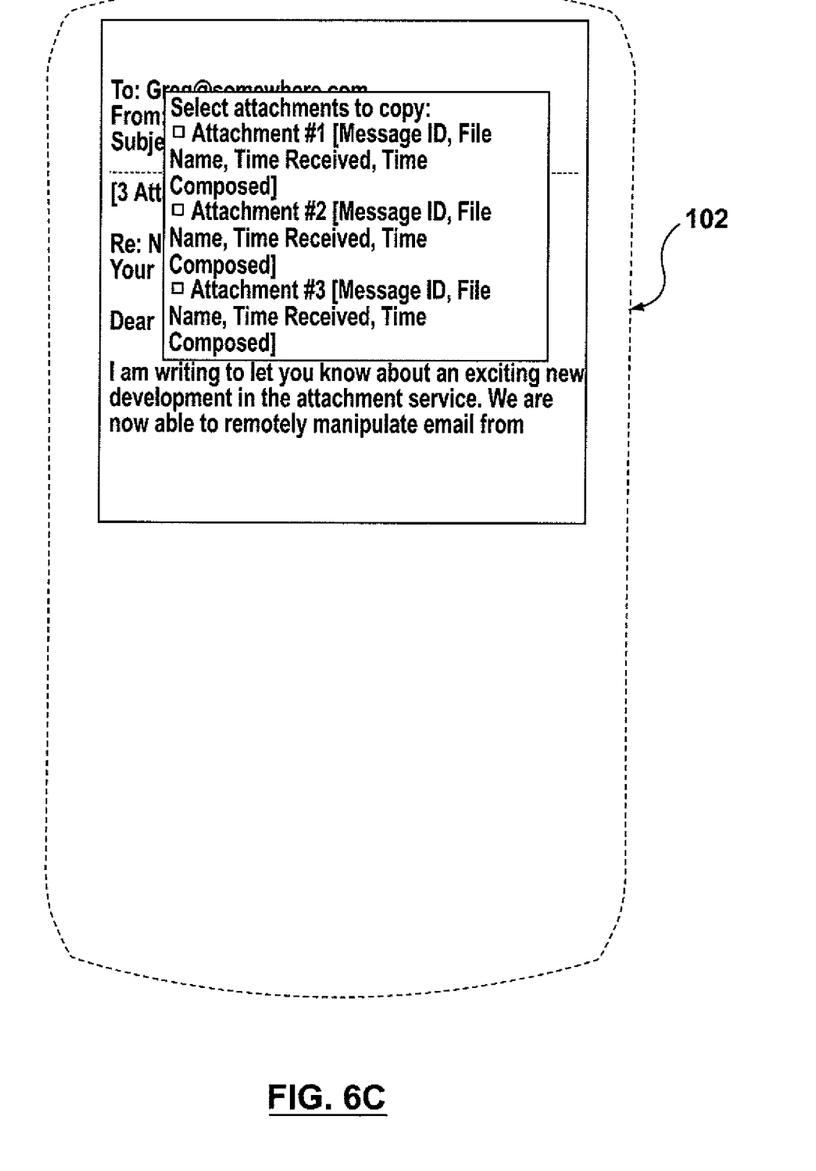
FIG. 6C shows an optional second user interface generated responsive to an affirmative user input to the first user interface of FIG. 6B, for selecting which of multiple attachments to copy.

In one embodiment, buffer 131 stores only a single attachment for permitting a single copy and paste operation, whereas in a further exemplary embodiment buffer 131 functions as a First In First Out (FIFO) memory for storing multiple attachments that are indexed within buffer 131 using the message ID (to distinguish attachments from different messages) and the attachment file name (to distinguish multiple attachments to a single message), as shown in FIG. 4C. Therefore, in the event of multiple attachments (a "Yes" at step 413 of FIG. 4B), a further dialog is generated (step 415), as shown in FIG. 6C, prompting the user to select which attachments to include in the reply. In particular, in order to assist the user in correctly selecting the desired attachment(s), for example when attachment file names are identical, the dialog preferably also displays a 'time handle', in addition to the original message ID and File Name. This time includes a 'time received' value indicating the time that the message was received at the handheld, and optionally a 'time composed' value indicating the time that the attachment was composed (this information is embedded in some attachments such as MS Word® documents).

The mobile communication device 102 then compresses, encrypts and delivers the message containing the "Reply With Attachment" command to the wireless network, which in response sends the message to the server 108 (step 414). The server 108 decrypts and decompresses the message, and invokes the attachment server process over the appropriate port to retrieve the attachments from the user's inbox (message store) at mail server 122, and temporarily store the attachments in buffer 131 (step 416).

The server 108 then sends an acknowledgement message back to the mobile communication device 102, including the message ID, file name, time received and time composed of each of the buffered attachments, which are then cached by the device 102 for later paste operations.

Figure 4D:
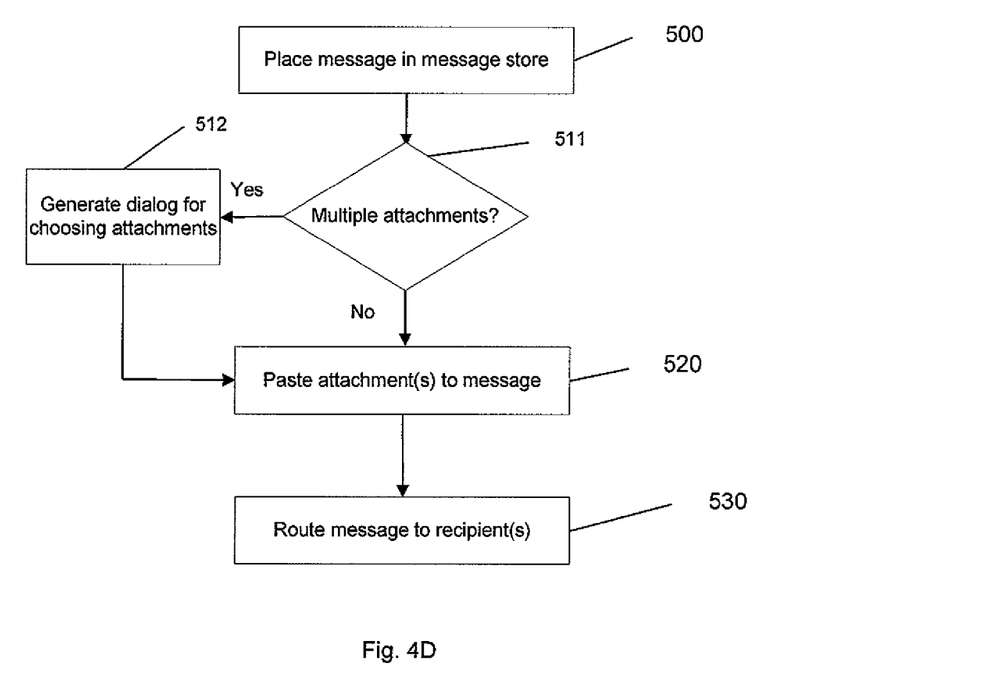
FIG. 4D is a flowchart showing steps of an exemplary method for sending a reply message to a distribution list and forwarding the message to a new recipient, according to an aspect of the method of FIGS. 4A and 4B.
Figure 6D:
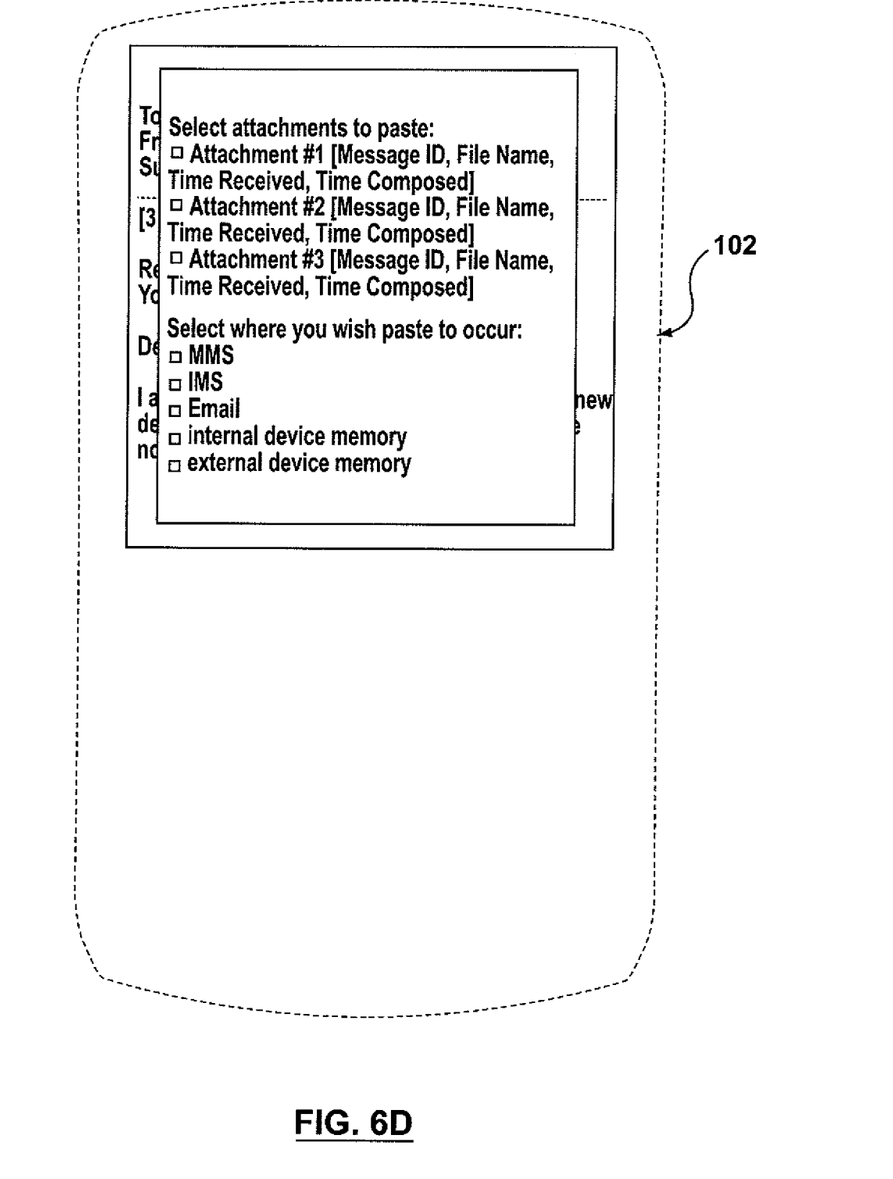
FIG. 6D shows a further user interface for selecting which of the multiple attachments selected in FIG. 6C to paste.

At step 417, shown in greater detail in FIG. 4D, server 108 places the message in the user's mailbox (step 500) at mail server 122 (addressed to all recipients indicated in the original distribution list and the new recipient. In the event of a single attachment (a "No" at step 511), the server 108 then invokes the attachment server process to paste the attachment from buffer 131 to the message (step 520). Where the message contains multiple attachments, (a "Yes" at step 511), a further dialog is generated (step 512), as shown in FIG. 6D, prompting the user to select attachments for inclusion in the reply. The user selects the attachments to be pasted by the attachment server process according to the displayed file information, including message ID, file name, time received and, optionally, time composed. The mail server 122 then routes the message (and all pasted attachments) to all recipients in a well known manner (step 530).

Figure 6E:
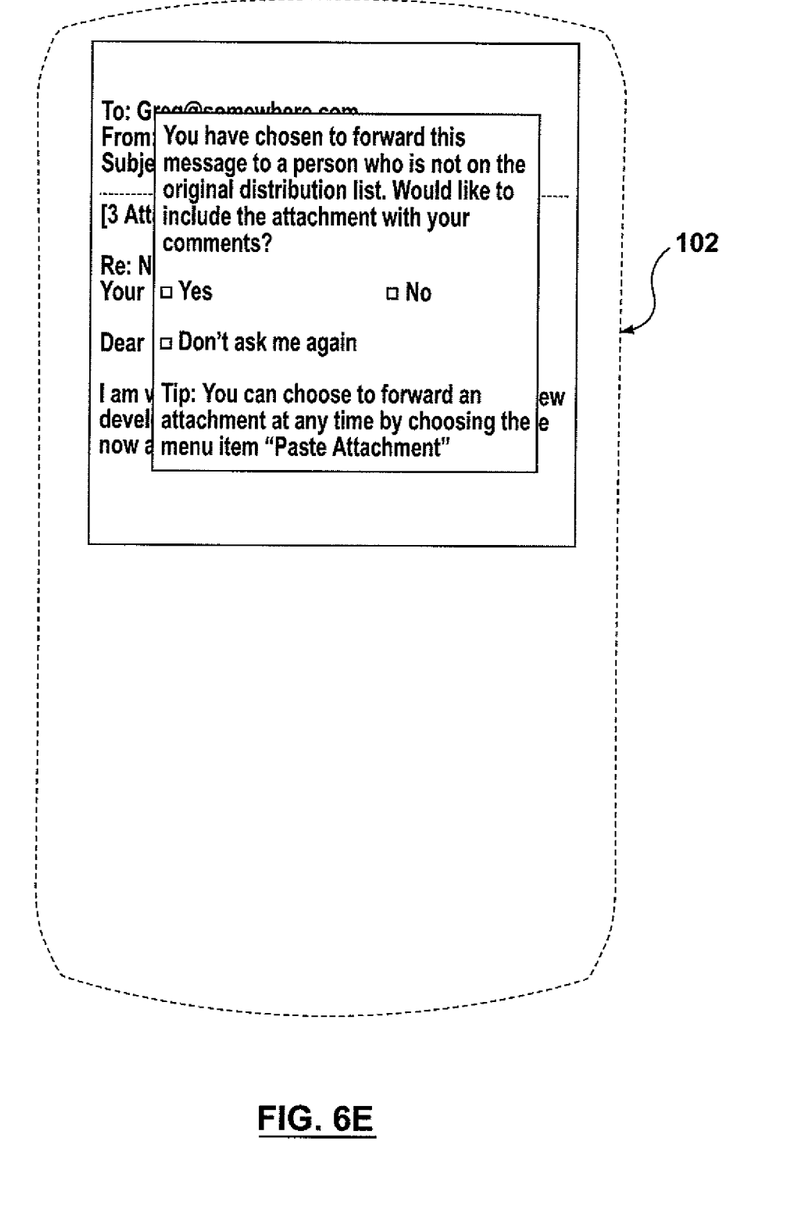
FIG. 6E shows a user interface generated responsive to user selection of a Forward With Attachment option of the menu options shown in FIG. 6A.

Upon user selection (step 408) of the "Forward With Attachment" menu option, the mobile communication device 102 generates a dialog screen (step 418), as shown in FIG. 6E, requesting confirmation that the user intends to forward the attachment to a person who is not in the original distribution list. If the user responds affirmatively at step 420 ("Yes" at menu option), and if there is only one attachment (a "No" at step 423 of FIG. 4B), the mobile communication device 102 compresses and encrypts a message containing the "Forward With Attachment" command over the appropriate port to the wireless network, which in response sends the message to the server 108 (step 424). The server 108 decrypts and decompresses the message, and invokes the attachment server process over the appropriate port to retrieve the attachment from the user's inbox (message store) at mail server 122, and temporarily stores the attachment in buffer 131 (step 426).

In the event of multiple attachments (a "Yes" at step 423 of FIG. 4B), the dialog of FIG. 6C is generated (step 415), prompting the user to select which attachments to include in the reply, as discussed above.

At step 428, the server 108 then places the message in the user's mailbox at mail server 122 (addressed to the new recipient), and invokes the attachment server process to paste the attachment(s) to the further message. The mail server 122 then routes the message to the new recipient, along with the original message thread (identified by MessageID) and attachments (identified by file name), according to steps 500, 511, 512, 520 and 530 set forth in FIG. 4D.

Upon user selection (step 408) of the "Copy Attachment" menu option, the mobile communication device 102 compresses, encrypts and delivers a message containing the "Copy Attachment" command to the wireless network, which in response sends the message to the server 108. The server 108 decrypts and decompresses the message, and invokes the attachment server process over the appropriate port to retrieve the attachment(s) from the user's inbox (message store) at mail server 122, and temporarily store the attachment in buffer 131 (step 429).

Figure 6F:
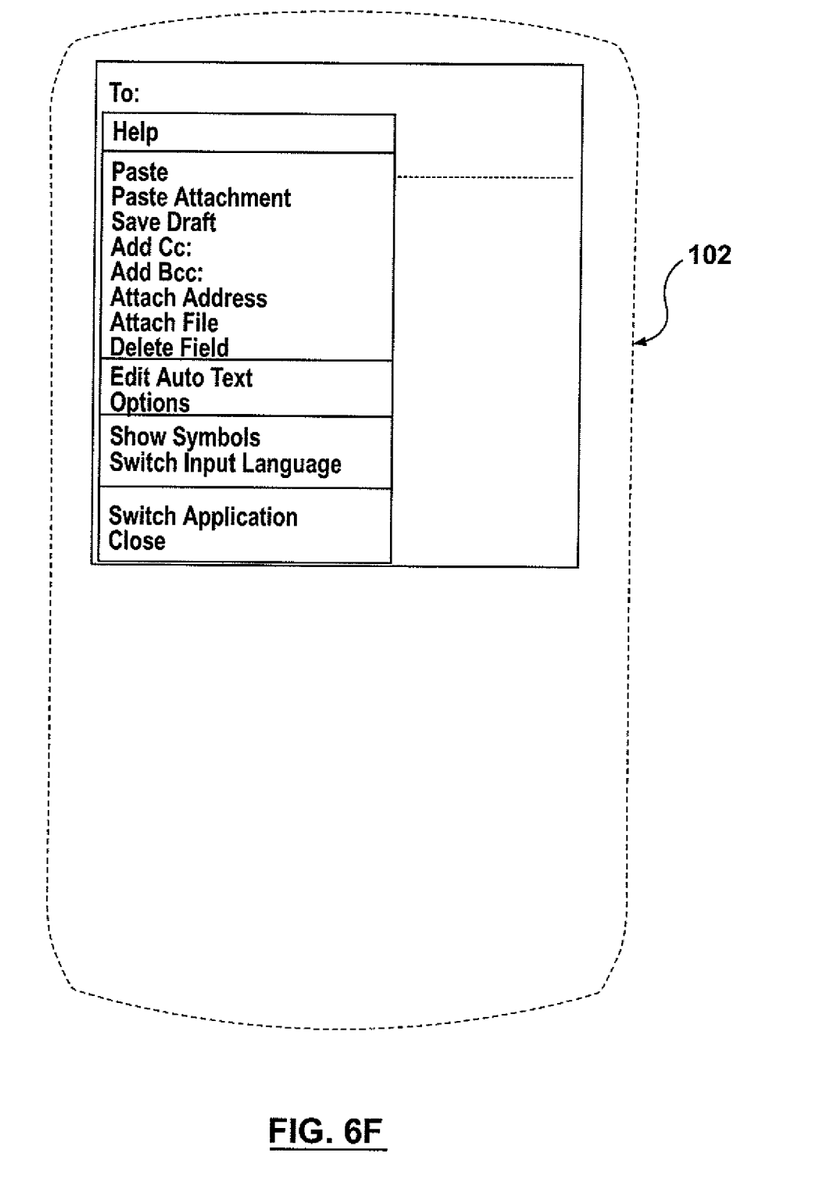
FIG. 6F shows a graphical user interface of menu options available when composing an email, including an option to paste an attachment from the attachment buffer of FIG. 4B.

Once the attachment (or multiple attachments) has been stored in buffer 131, the "Paste Attachment" menu option is available to the user when composing a new message (see FIG. 6F). In response to user selection of the "Paste Attachment" option followed by "Send", the mobile communication device 102 sends the message to the server 108 in the manner discussed above in connection with FIG. 4C, which causes the attachment server process to paste the temporarily stored message(s) from buffer 131 to the message sent by the server 108 to the mail server 122 for delivery.

As discussed above, in the event of multiple attachments, a menu dialog is presented (FIG. 6D) listing all attachments available for pasting from buffer 131, in order of receipt (i.e. FIFO), such that as the capacity of buffer 131 is exceeded the oldest attachment is discarded to make room for a new attachment.

Also, as shown in FIG. 6D, according to one embodiment the user may be presented with an option to paste the attachment(s) to locations such as a Multimedia Message Service (MMS), Instant Messaging Service (IMS), internal device memory or external memory, or to the new, replied or forwarded email, as discussed above. This dialog may be presented in conjunction with the attachment selection menu as shown in FIG. 6D, or alternatively may be presented as a separate menu dialog independently of whether there are multiple attachments in the buffer 131.

A person of ordinary skill in the art will appreciate that there are other applications of the remote attachment manipulation set forth herein. For example, in one scenario the user may store an attachment in buffer 131 responsive to a warning message from the mail server 122 that the user has exceeded his/her storage limit.

It will also be appreciated that the steps set forth in FIG. 3 may be applied to manipulating attachments in Instant Messaging (IM) applications, and need not be confined to manipulating attachments to emails.

Specific embodiments have been shown and described herein. However, modifications and variations may occur to those skilled in the art. For example, as discussed above, although the exemplary embodiment has been described in terms of implementation on a mobile communication device 102 that is based on the computing environment and functionality of a wireless personal digital assistant (PDA), the principles set forth herein may be applied to other devices such as portable entertainment devices with email or IM functionality, etc. All such modifications and variations are believed to be within the sphere and scope of the present embodiment.

What is claimed is:

1. A method of manipulating email attachments within a server remotely from a mobile communication device, comprising:
   receiving a first message within said server, said message having at least one attachment and a recipient;
   receiving a user input to manipulate said attachment without downloading said attachment to said device;
   sending a further message to said server from said mobile communication device responsive to said a user input; and
   temporarily copying said attachment into a buffer within said server for subsequent re-use, further comprising attaching said attachment from said buffer into an additional message and sending said additional message to a further recipient, wherein sending said additional message includes at least one of (i) replying to a sender or a recipient of said first message while adding said further recipient and including the attachment in the reply to the further recipient, and(ii) sending a new message to the further recipient that includes the attachment but not said first message.

2. A method as claimed in claim 1, wherein said attachment is temporarily copied into said buffer with a message ID of said first message and a file name of said at least one attachment.

3. A method as claimed in claim 1, wherein said attachment is temporarily copied into said buffer with a message ID of said first message, a file name of said at least one attachment file, and at least one time value indicating at least one of a time that the message was composed or a time that the message was received at said mobile communication device for allowing multiple attachment files of the same name to be distinguished by said at least one time value.

4. A method as claimed in claim 3, further comprising generating a dialog box at said mobile communication device prior to sending said further message for identifying said at least one attachment by at least one of said message ID, file name, and at least one time value.

5. A method as claimed in claim 1, further comprising generating a dialog box at said mobile communication device prior to sending said further message, for encouraging remote manipulation of said attachment.

6. A server, comprising:
   a buffer; and
   an attachment server process for receiving a first message having at least one attachment and a recipient; receiving a second message remote from said server to manipulate said attachment; temporarily copying said attachment into said buffer responsive to said second message and including said attachment from said buffer into a further message to a further recipient, wherein said attachment server process further copies into said buffer an identifier for allowing multiple attachment files of the same name to be distinguished using said identifier comprising at least one of a message ID of said first message, a file name of said at least one attachment file, and a time value indicating the time that the message was composed.

7. A server as claimed in claim 6, wherein said buffer is a First In First Out (FIFO) memory for storing said at least one attachment indexed with a message ID of said first message and a file name of said at least one attachment.

8. A method on a server, comprising:
   receiving a first message having at least one attachment and a recipient;
   receiving a second message remote from said server to manipulate said attachment; and
   temporarily copying said attachment into a buffer responsive to receiving said second message, and attaching said attachment from said buffer into an additional message and sending said additional message to a further recipient, wherein sending said additional message includes at least one of (i) replying to a sender and the recipient of said first message while adding said further recipient and attaching the attachment in the reply to the further recipient, and (ii) sending a new message to the further recipient, wherein the new message includes the attachment but not said first message.

9. A method as claimed in claim 8, wherein said attachment is temporarily copied into said buffer with a message ID of said first message and a file name of said at least one attachment.

10. A method as claimed in claim 8, wherein said first message is one of either an email message or Instant Message (IM).

11. A mobile communication device, comprising:
    a communications subsystem for receiving a first message having at least one attachment;
    a display; and
    a content handling application for receiving a user input to manipulate said attachment without downloading said attachment to said device, and sending a second message via said communications subsystem responsive to the user input, for remotely manipulating said attachment, and wherein the user input for manipulating said attachment comprises at least one of (i) replying to a sender or a recipient of said first message while adding a further recipient and including the attachment in the reply to the further recipient, and (ii) sending a new message to the further recipient, wherein the new message includes the attachment but not said first message.

12. A mobile communication device as claimed in claim 11, wherein said content handling application generates a dialog box on said display prior to sending said second message, for encouraging remote manipulation of said attachment.

13. A mobile communication device as claimed in claim 11, further comprising displaying at least one menu option for receiving said user input on said display.

14. A mobile communication device as claimed in claim 11, wherein said replying to a sender or said recipient of said first message comprises replying to all recipients.

15. A method on a mobile communication device, comprising:
    receiving a first message identified by a message ID and having at least one attachment identified by at least one of a file name and a time value;
    displaying at least one menu option for manipulating said attachment without downloading said attachment to said device; and
    sending a second message responsive to selection of said at least one menu option, for remotely manipulating said attachment, wherein said manipulating includes at least one of (i) replying from said mobile communication device to a sender and all recipients of said first message while adding a further recipient and attaching the attachment in the reply to the further recipient, and (ii) sending a new message to the further recipient that includes the attachment but not said first message.

16. A method as claimed in claim 15, further comprising generating a dialog box prior to sending said second message, for encouraging remote manipulation of said attachment.

17. A method as claimed in claim 15, further comprising generating a dialog box at said mobile communication device prior to sending said second message for identifying said at least one attachment by at least one of said message ID, file name, and time value.

18. A method of a communication device, the method comprising:
- receiving at the communication device a first message having an attachment;
- receiving a user input to generate a reply to the first message;
- adding a further recipient in the reply, wherein the further recipient is not a recipient of the first message; and
- sending the reply, including automatically sending the attachment to the further recipient.

19. The method of claim 18, further comprising generating a prompt at the communication device prior to the sending the attachment to the further recipient, the prompt requesting for a confirmation to send the attachment to the further recipient.

20. The method of claim 18, wherein the communication device receives a plurality of attachments, the method further comprising displaying an option to exclude at least one of the plurality of attachments from being sent to the further recipient.

* * * * *